US008392874B2

(12) United States Patent
Gruber et al.

(10) Patent No.: US 8,392,874 B2
(45) Date of Patent: Mar. 5, 2013

(54) CREATING AN EXECUTABLE CONFIGURATION

(75) Inventors: Werner Gruber, Kindberg (AT); Dietmar Peinsipp, Graz (AT); Peter Priller, Judendorf-Strassengel (AT); Gerald Stieglbauer, Lohnsburg am Kobernausserwald (AT)

(73) Assignee: AVL List GmbH, Graz (AT)

( * ) Notice: Subject to any disclaimer, the term of this patent is extended or adjusted under 35 U.S.C. 154(b) by 881 days.

(21) Appl. No.: 12/461,085

(22) Filed: Jul. 30, 2009

(65) Prior Publication Data

US 2010/0077376 A1    Mar. 25, 2010

(30) Foreign Application Priority Data

Aug. 4, 2008  (AT) ...................................... 420/2008

(51) Int. Cl.
*G06F 9/44* (2006.01)
(52) U.S. Cl. ...................................................... 717/104
(58) Field of Classification Search .................. None
See application file for complete search history.

(56) References Cited

U.S. PATENT DOCUMENTS

| 6,446,202 | B1 | 9/2002 | Krivoshein et al. | |
|---|---|---|---|---|
| 7,231,272 | B2* | 6/2007 | Herkert ............................ | 700/97 |
| 7,571,390 | B2 | 8/2009 | Langkafel et al. | |
| 7,581,226 | B2 | 8/2009 | Thurner | |
| 7,774,167 | B2* | 8/2010 | Bregulla et al. ................ | 702/183 |
| 2001/0037412 | A1* | 11/2001 | Miloushev et al. ........... | 709/315 |
| 2004/0133289 | A1* | 7/2004 | Larsson et al. .................. | 700/83 |
| 2005/0235262 | A1* | 10/2005 | Burgess ........................ | 717/120 |
| 2007/0093994 | A1 | 4/2007 | Kodosky et al. | |
| 2007/0143095 | A1 | 6/2007 | Yu et al. | |
| 2008/0059839 | A1* | 3/2008 | Hamilton et al. ............... | 714/26 |

FOREIGN PATENT DOCUMENTS

| JP | 2002236504 | 8/2002 |
|---|---|---|
| JP | 2005222221 | 8/2005 |
| WO | 2005083533 | 9/2005 |

OTHER PUBLICATIONS

National Instruments Corp: "Labview Real-Time Module User Manual," Apr. 2004.

* cited by examiner

*Primary Examiner* — Philip Wang
(74) *Attorney, Agent, or Firm* — Dykema Gossett PLLC

(57) ABSTRACT

A process for creating an executable configuration that can be run on a target system by selecting from a library a number of abstracted software components that are independent of the target system that implement individual functions of the target system and that are provided with a specified command interface and a specified interface to data channels, the selected software components that are independent of the target system are interconnected via their data channels for the realization of the automatization task to a model which is automatically transformed by a model transformation into a net list of nodes, attributes and edges, whereby the software components form the nodes, the initial parameters, the attributes and the data channels the edges of the net list, the software components that are independent of the target system are transformed into software components dependent on the target system, the software components that are dependent on the target system are instantiated at the target system and parameterized by their command interface and from the net list, the processing sequence of the software components is identified for processing in correct information flow.

13 Claims, 3 Drawing Sheets

CREATING AN EXECUTABLE CONFIGURATION

BACKGROUND OF THE INVENTION

1. Field of the Invention

The present invention concerns a process for creating a configuration executable on a target system for performing an automatization task on the target system, preferably an automatization unit for the development of a vehicle or a vehicle component, as well as a device for creating and running a configuration executable on a target system for performing an automatization task on the target system, preferably an automatization unit for the development of a vehicle or a vehicle component.

2. The Prior Art

Modern test stands for the development of a vehicle or a vehicle component must satisfy a number of demands and must cover numerous automatization tasks such as, for example, the control and regulation of various test stand components and test runs, performing diverse measurements on the specimen, visualization of the test stand and the data, etc. But the automatization unit of current test stands is, primarily for historic reasons, a central system to which the various test stand components are connected by various interfaces. As a result, a central information and data pool is created in the automatization unit on which all utilities and services can draw. However, as a result of this, an inflexible system is created with limited scalability, as numerous changes are required in the automatization unit in order to integrate new components (SW and HW) (for example, a new interface, changed processing of data from the/to the component, adaptation of the integration into the existing system, etc.). This makes the changes or enhancements of the automatization unit or the implementation of specific customer requests very expensive. Moreover, as a result it is required that a number of different configurations are maintained, which makes maintenance of existing systems expensive. A further problem of the existing central automatization units is the absence of an easy possibility of integrating an external functionality such as, for example, a certain regulator of a customer or specific testing methods into the automatization unit. Beyond that, central system must also process all computations centrally, as a result of which the capacity limit of the CPU is reached quickly.

For this reason it is the problem of the present invention to indicate a device and a process for creating an executable program on a target system, particularly an automatization unit for the development of a vehicle or a vehicle component that is flexible on the one hand, and on the other, easy and quick to install and which can be adapted to the needs of the operator of the target system. A further task is to design the unit in such a way that even external functionalities can be integrated into the target system in an easy way.

SUMMARY OF THE INVENTION

This problem is solved by the process in which a number of abstracted software components are selected from a library, said software components are independent of the target system and perform the individual functions of the target system and which have a specified command interface and a specified interface to the data channels, the selected software components that are independent of the target system are interconnected via their data channels to a model for realizing the automatization task, the model is automatically transformed by a model transformation into a net list consisting of nodes, attributes and edges, whereby the software components form the nodes, the initial parameters the attributes and the data channels the edges of the net list, the software components that are independent of the target system are transformed into software components dependent on the target system, the software components dependent on the target system are instantiated at the target system and parameterized via their command interface and the processing sequence for processing the software components in the correct information flow is identified in the net list. The device solves this problem with a development unit that can be connected with the target system and in which a library is provided from which a number of abstracted software components are selectable via a user interface that are independent of the target system and perform individual functions of the target system and that are provided with a specified command interface and a specified interface to the data channels and the selected software components that are independent of the target system can be interconnected into a model via their data channels for realizing the automatization task, further, a model transformation unit is provided that automatically converts the model by a model transformation into a net list consisting of nodes, attributes and edges, whereby the software components are the nodes, the initial parameters the attributes and the data channels the edges of the net list, and further a target system transformation unit is provided that transforms the software components that are independent of the target system into software components that are dependent on the target system, instantiates the software components dependent on the target system at the target system and parameterizes such via their command interface and identifies the processing sequence of the software components from the net list for processing according to the correct information flow.

As a result of the use of abstracted software components, a certain automatization task can be performed easily and flexibly. Thereby, the software components can be created as per the requirements according to which a simple adaptation to the target system and also the easy integration of external functionalities is made possible. With respect to central systems such as, for example, automatization units to date, in which based on the inflexible arrangement of all processing steps, it was difficult to make an adaptation to the actual information flow and thus processing according to the correct information flow was only possible with great difficulty, in the component-oriented method according to the invention, optimal processing using the correct information flow can be ensured. Beyond that, the system can simply be adapted at the component level and scaled, for example, by exchanging only individual components without having to change the entire target system. With that, one achieves an extremely flexible process for creating executable configurations. Beyond that, the individual components can be developed independently and separate from each other which, for example, makes the expansion of functionality very easy. Moreover, it is made possible thereby that a component can be present in several versions in parallel at the target system, which increases flexibility. Moreover, as a result of this structure, simple and efficient distribution to several CPUs/cores is possible.

As a result of the type of creation of the executable configuration in accordance with the invention, advantageously in the creation of the configuration already, particularities or specifications of the target system can be taken into consideration, which makes an optimized configuration or processing sequence possible on the respective target systems. For this purpose is can also be provided that a filter and/or a sampling element is automatically proposed or inserted into the executable configuration in the even frequency changes occur in the information flow. At the target system, the software components can at least partially be processed in different threads, whereby different threads can also be synchronized at different frequencies. This makes high performance processing of the configuration at the target system possible. Advantageously, also running at the target system for this are generic processes that make processing area, mail boxes and threads available, into which the software components are loaded as dynamically loadable library and can be instantiated as many times as desired. Further, a software component can also be provided with a trigger, whereby the trigger information can automatically and transparently be routed along a processing sequence, which makes the reaction of the software component to certain events possible. Monitoring of the processing can be achieved when a time budget is allocated to a trigger of a software component, and a software component that exceeds this time budget is suspended or sends a warning. Likewise, it is advantageous to process a software component at the target system in a cycle more than once, in order to, for example, execute needed tasks only later when the resources for such are available, which can increase reaction time.

In order to be particularly flexible, it can advantageously be provided that the processing sequence, while running is switched or modified between two complete cycles, while the new cycle prepares and the switching/modifying then takes place synchronously between the end of one and the beginning of the next cycle, practically without overhead.

A change of an executable configuration can be performed very easily, flexibly and quickly using Delta net lists, whereby a Delta net list describes the net parts that are to be removed and the net parts that are to be added and the exchange takes place at favorable point in time as per the processing sequence. Software components that are not affected by this can therefore continue to be executed unhindered in the runtime system. In this way, partial changes in the system become possible without having to stop the entire system.

The performance of the processing of the executable configuration can be increased further when the software components are executed at the target system on different CPUs or different cores of a CPU. As a result of the fine-grained structure of software components, fine distribution can take place at the target system. This also makes optimized processing of the configuration at the respective target system possible.

BRIEF DESCRIPTION OF THE DRAWINGS

In the following, the present invention is described in detail in conjunction with FIGS. 1 to 3 showing schematic examples in non-limiting advantageous embodiments. Shown are FIG. 1 a block diagram of a test stand with an automatization unit, FIG. 2 a processing scheme for creating executable program code according to the invention, and FIG. 3 an example of a simple model of an automatization task.

DETAILED DESCRIPTION OF THE PREFERRED EMBODIMENT

Figure 1:
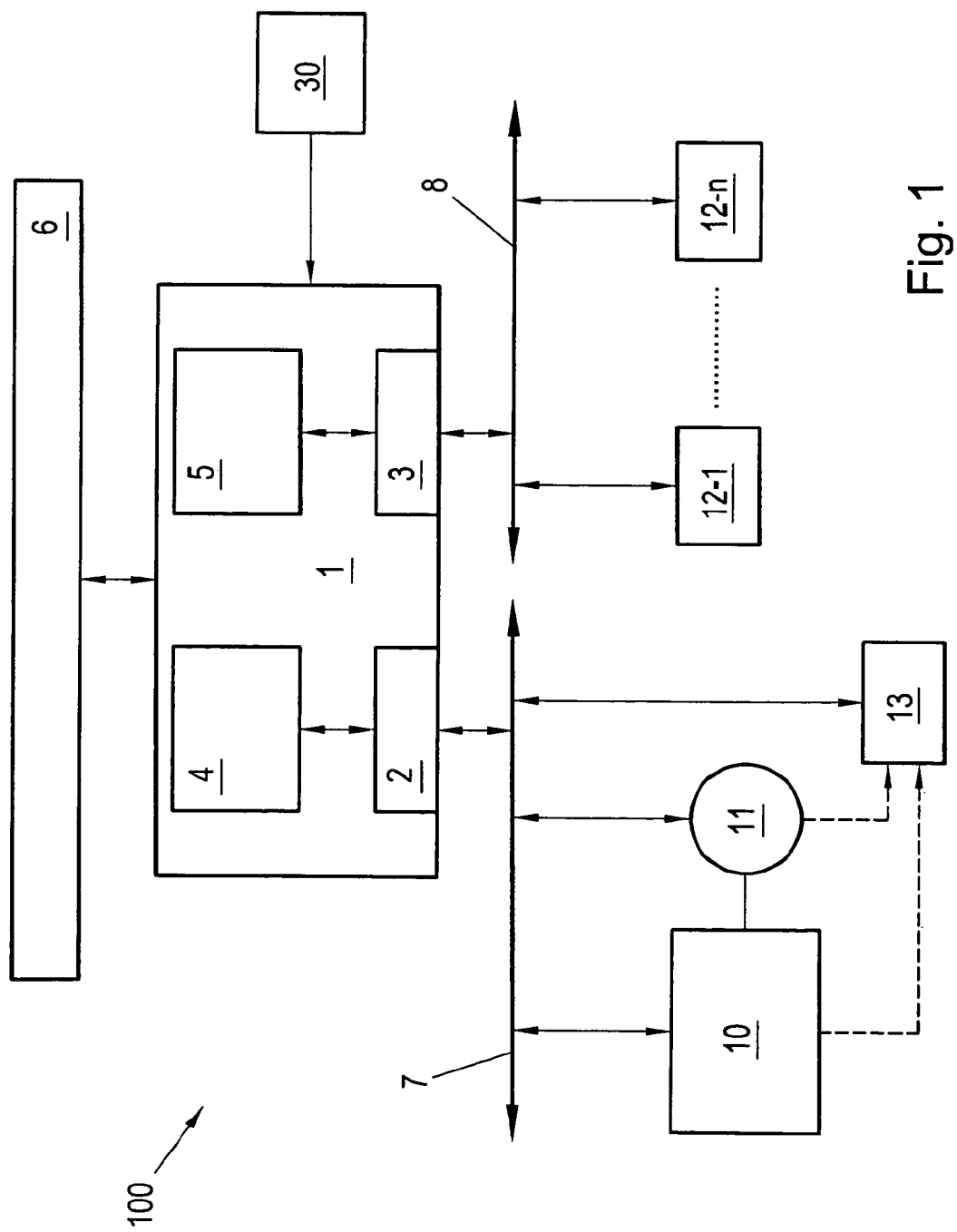

FIG. 1 shows a test stand 100 schematically, on which a specimen 10, e.g. an engine, a drive train or an entire vehicle is to be tested with respect to specific functions. As a rule, a dynamometer 11 is connected to the specimen 10, to be able to create certain load conditions. Specimen 10, as well as dynamometer 11 are thereby regulated according to the testing objective by an automatization unit 1 (target system) that is implemented at the test stand as hardware and in which the test stand software runs. In automatization unit 1, a regulation unit 4 is provided for this purpose, which communicates via an interface 2 with a data bus 7 with specimen 10 and the dynamometer 11. In addition, there are external units 13 such as, for example, an external data capture unit (DAQ), e.g. for quick (real time) measurements (indicated by the dotted lines) or an external control device, e.g. for distributed control or simulation could be provided which are needed for a certain test objective and that are also connected via data bus 7 with the automatization unit 1 or the specimen 10 or the dynamometer 11. For control objectives, as a rule, a fast data bus such as, for example, Ether CAT, profibus, CAN bus, Ethernet powerlink, etc. is provided in order be able to guarantee corresponding reaction times. In addition to the fast data busses an additional slower data bus 8 such as, for example Ethernet, profibus, CAN bus can be provided over which less time-critical data such as performance data can be transported. Naturally, several (fast and/or slow) data busses can be present. For this reason, in the automatization unit 1, an interface 3 is provided by means of which corresponding processing units 5 in automatization unit 1 can communicate with test stand components 12-1 to 12-n, for example, with measuring devices (e.g. blowby measurements, fuel consumption, water, oil, air or fuel sensors, exhaust measurements, etc.) or actuators (e.g. gearshift, coupling, gas pedal, etc.).

The automatization unit 1 of a test stand can also be connected with a superordinated test stand management unit 6 that controls and administers, for example, several test stands of a test facility or test factory or performs data management tasks.

Test stand software that consists of various program parts runs in automatization unit 1, for example, programs for data management, programs for executing certain automatization tasks (e.g. the regulation of the dynamometer, cycle control of measuring processes, specification of certain set point values, monitoring of the specimen, automatic reaction to exception situations, etc.), programs for communication with superordinated test stand management units, etc. These individual programs can thereby, as is known, run depending on the requirement, in a real time operating system or in a traditional operating system.

Now, an additional development unit 30 is provided which is connected with the automatization unit 1, e.g. directly or by a net and with which certain executable configurations, primarily configurations for running automatization processes can be created and loaded into automatization unit 1. Thereby, an executable configuration essentially consists of various software and hardware components in such a way that these work together and in a way in which such a configuration must be processed for performing the automatization task. For this reason, software is also installed in the automatization unit 1 which can interpret and execute such configurations. The loading of the configuration can thereby also naturally also be done via test stand management unit 6 or a data bus 7, 8. Likewise, the development unit 30 can be an integral part of the automatization unit 1.

Figure 2:
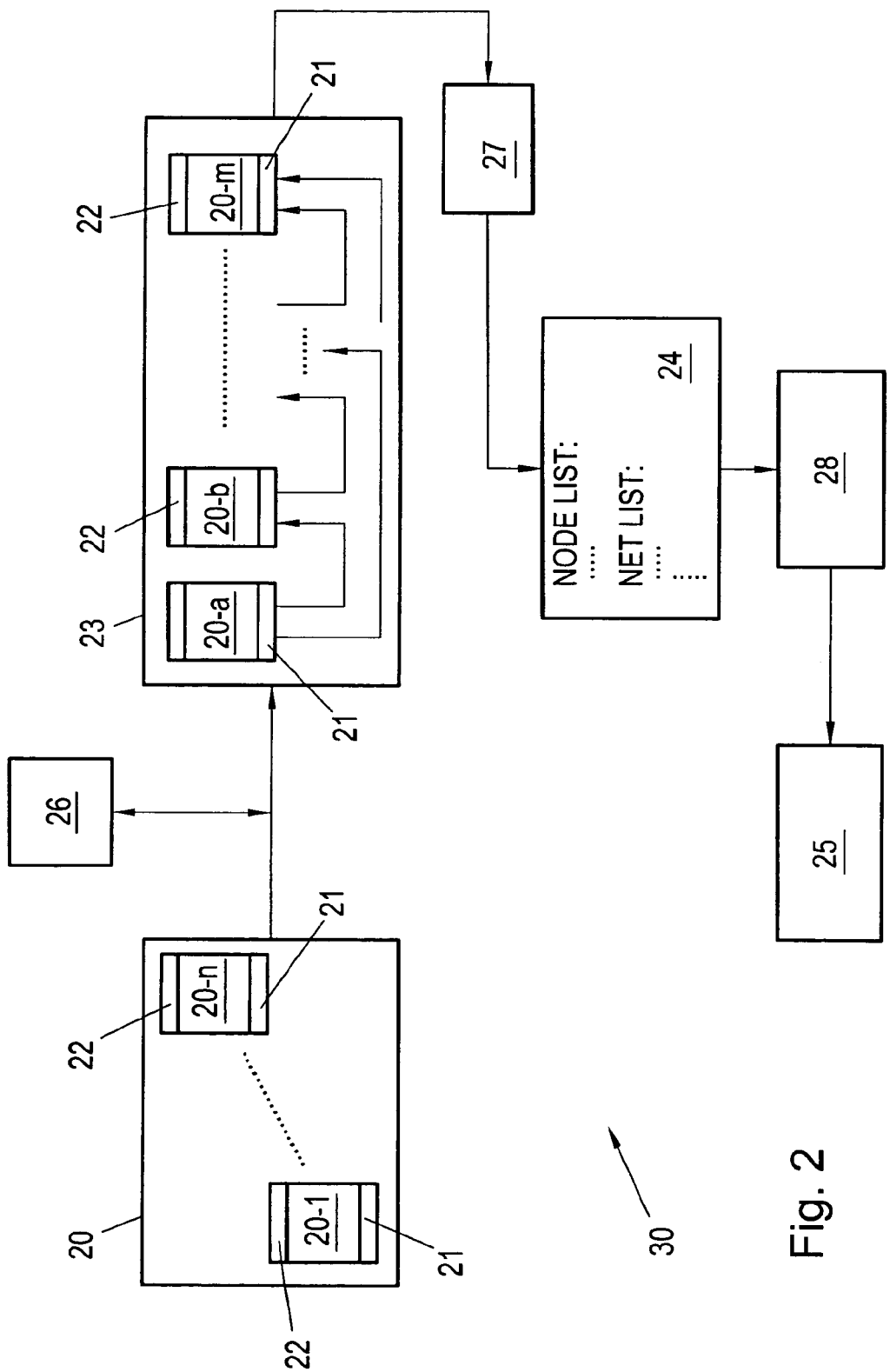

In order to be able to create such an executable configuration, a library (storage) is provided in development unit 30 for abstracted software components 20-1 to 20-n, that convert individual functions of the automatization unit 1, e.g. a filter, an I/O interface, a mathematical function, a controlling law or an external functionality, etc., such as schematically shown in FIG. 2. Here, "abstracted" means that the saved software components 20-1 to 20-n are not yet specifically marked (dependent on the target system), but are only described by their general function, for example, as I/O interface and not as CAN input or output. These software components 20-1 to 20-n can be predefined or can be created new via corresponding user interfaces as needed. Each software component 20-1 to 20-n is executed with a specified, identical command interface 22 and a specified identical interface 21 to a data channel of automatization unit 1. A data channel generally transports scalar or vectorially organized data in various formats (e.g. integers, floating decimals, etc.) cyclically or event-oriented from one data generator to one or more data consumers and can, for example, be designed as a bus. Software components do not have any direct or reciprocal dependencies and can thus be largely maintained independent of each other. These software components can also be present in parallel with various characteristics. In the ideal case, there is a description of an abstract modeling language in a marking that is independent of the target system. Connected with it (mapped) there can also already be a specific description present for a certain target system (i.e. a certain automatization unit 1). Both can already be present at the target system or in an independent system. Then there can also be the actually processing software components compiled as executable at the target system itself.

Finally, all software components must be available as executable executables at the target system. These executables can already be present at the target system or can be sent to the target system at a later point in time, e.g. during the installation of new software components.

Figure 3:
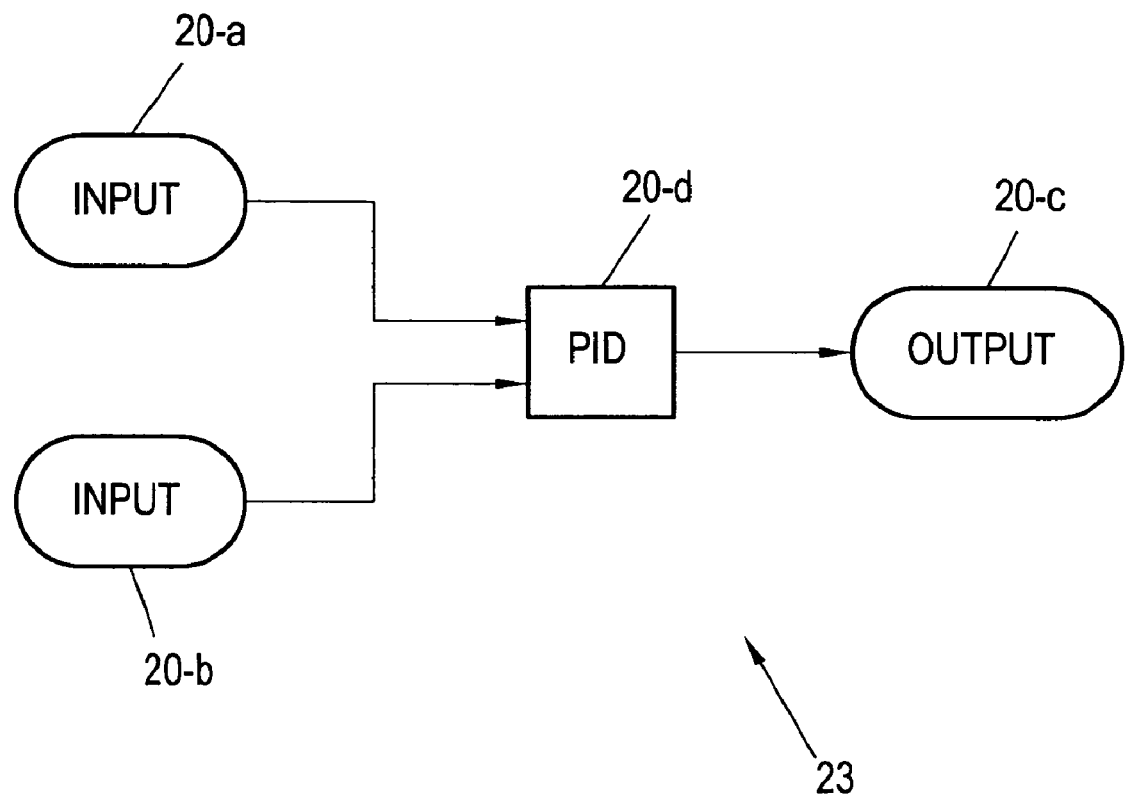

From the library 20, according to the automatization task that is to be performed (e.g. automatically running test runs in which the specimen is assigned a certain requirement profile (e.g. torque/moment of rotation) time or path-controlled and its behavior is determined in characteristic values and characteristic times, or the repeated shutdown of switching operations in a gear for determining signs of wear, or the determination of characteristic curves of combustion engines and the automatic optimization of performance criteria or exhaust criteria, etc.) via a suitable user interface 26 a number of software components 20-a to 20-m is selected and is interconnected via the data channels 21 to a, still abstracted, model 23 of the automatization task. A simple model 23 of a regulator is shown in FIG. 3. Model 23 thereby consists of four software components 20-a to 20-d, whereby two of them are inputs, a software component of the controlling law of the PID regulator is realized with the two inputs, and the computed output variables are put out by an output. Thereby, a model 23 can, depending on the automatization task that is to be preformed, naturally have almost any complexity.

By a model transformation unit 27, model 23 is transformed by a model transformation into a net list 24 consisting of nodes, attributes and edges, whereby the software components 20-a to 20-m form the nodes, the initial parameters of the software components the attributes and the data channels 21 the edges of net list 24. Such model transformations are known per se and as a rule, consist of several sequential transformation steps. Thereby, as a result of unambiguous identification of the software component type and version, several versions of the same software component can be run in the same system in parallel. Net list 24 can be present in a structured descriptive language such as, for example XML. Such a net list 24 describes, preferably in abstracted form, the totality of the software components 20-a to 20-m used, as well as their complete interconnections. As a result of this simple illustration, the desired functionality can be built very quickly in the run-time system and still independent of the target system.

Net list 24 is an abstract description of the automatization task that is to be implemented and can be independent of the target system. For that reason, net list 24 can be decoded by executable configurations 25 in various target systems as needed. In order to create an executable configuration 25 from net list 24 in a target system transformation unit 28, the software components that are not target system-specific are now mapped for target system-specific components, i.e. a general input now becomes a specific CAN input. For this, the information needed for this is either already present in development unit 30, e.g. when the target system and its components and resources are already previously known, or the development unit 30 combines itself with the target system (for example, with a certain test stand) and queries all required information, i.e. which specific components and resources are present at the target system, how these are connected, etc. Thereby, m:n relationships are possible, i.e. one component can also be distributed over several target system-specific components or summarized, whereby 1:1 relationships are aimed for, i.e. a component that is independent of the target system is mapped in a component that is dependent on the target system. Further, the target system transformation unit 28 separates resources according to available channels as per components with their input and output ports, parameters as well as networking information and processing sequence and from this it creates a net list that is dependent on the target system, i.e. the executable configuration 25. The structural design of this net list that is dependent on the target system is laid out advantageously for high-performance instantiation that can be parallelized.

Further, the software components that are used 20a- to 20-m are instantiated in the target system and parameterized via their command interfaces 22 as per the specifications.

The processing sequence of the connected software components 20-a to 20-m is created in the target system transformation unit 28 from net list 24, for example, with known information flow graph analysis of graph theory. Of course, any other suitable method can be used as well, for example, identify dependencies in the net list and back-track recursively. The processing sequence for processing net list 24 in the direction of information flow can thereby already take place offline, for example, in the development unit 30, and also prior to the transformation of net list 24 into a net list that is dependent on the target system, or also only at the target system itself. Thereby, processing in the correct information flow means that sequences are put together from behind one another into active computing steps that calculate the pertaining instance of a component that is to be computed/processed and perhaps also contains additional information such as, for example phase (trigger/post trigger, etc.). Two separate sequences distinguish themselves as advantageous thereby, that they have no data dependencies and can therefore also be computed independent of each other or cycled through, which represents a requirement for parallelizing on multicore/multi-CPU systems.

As a net list 24 or the model 23 can be provided with a thoroughly complex structure, in this step in the processing as per the correct information flow, several things can already be advantageously taken into consideration. Filters, for example, or sampling elements can be proposed automatically or used, in the event frequency changes in the information flow should occur. Processing in various frequencies is also possible, for example, by creating various threads the priority of which is specified, for example, as per rate monotonic scheduling. To do so, it can also be provided that the software components themselves do not have a thread, but only the environment, i.e. that a generic environment makes a processing area, a thread management, a known DLL/RSL management and one or more mail boxes available. Thereby, a thread pool is available of which respectively one thread is blocked at a mail box and in the event of a message to a component that is in the processing area accepts this message and allocates it to the component for execution. Thereupon, the next thread "slides" out of the pool and then waits at the mail box. Each, or individual software component(s) also have a trigger, whereby the trigger information can be routed automatically and transparently along the processing sequence (trigger sequence), for example via CPU—process—component. In the trigger sequence, every entry can also be given a time budget. A component that exceeds this time budget can be suspended or a warning can be sent. An intelligent distribution into more than one phase can also be undertaken, i.e. a software component could occur more than once in a phase, i.e. a software component can come up more than once in a cycle (e.g. a cycle in a cyclical system. Example cycle 100 Hz→one cycle therefore lasts 10 ms). In principle, a software component only always performs that in a cycle, which is directly and immediately required for the next software component and then it already goes on. As a result of the intelligent distribution, later, necessary things can still be done in the same cycle. Likewise, the processing sequence can still be switched or modified, practically without overhead, during run-time between two complete cycles. For this, the processing is prepared, whereby the switching/modifying then takes place synchronously between the end of one and the beginning of the next cycle.

As a result of the uniform form of all software components, at the point in time of instantiation, a suitable algorithm can decide on which CPU or on which core of a CPU of the target system which software component is to be executed. But this distribution of processing of the software components can likewise also only take place at the target system. The distribution thereby advantageously takes place by component, i.e., it is not parts of a software component that are put on various cores/CPUs, but the entire software component as a unit is allocated to a core/CPU. As a result of the fine-granular structure of the software components, fine distribution is possible as well. For this, there are various known methods per se: Each component has its own limitations, i.e. each software component has its own defined requirements. A solver then solves this constraint-satisfaction problem. In several valid solutions, a simulation can then still find the optimal solution or even review the operability. Another method would be, for example, a genetic algorithm, likewise with subsequent simulation of the distribution and evaluation of the "fitness". For this reason, any complex net list 24 is easily parallelizable and can be optimally divided between multi-CPU or multicore systems. This is also supported by the nature of the data channels as globally equally accessible data channels by all CPUs.

Changes of a model configuration are thus easily possible via delta net lists. Such delta net lists describe the net parts that are to be removed (or software components and their connection), followed by the net parts that are to be added (or software components and their connection). The exchange can then take place as per the processing sequence at a favorable point in time, for example, between two cycles. Software components that are not affected by this can therefore continue to be executed unhindered in the run-system. In this way, partial changes in the system are made possible without having to stop the entire system.

The invention claimed is:

1. A process for creating a configuration (25) executable on a target system for performing an automatization task on the target system and wherein software components are executed by at least one CPU at the target system, comprising the steps of
- from a library (20) a number of abstracted software components are selected that are independent of the target system (20-a, 20-b . . . 20-m) and perform individual functions of the target system and have a specified command interface (22) and a specified interface (21) to data channels,
- the selected software components that are independent of the target system (20-a, 20-b . . . 20-m) are interconnected into a model (23) via their data channels for realizing the automatization task,
- the model (23) automatically transforms as a result of a model transformation into a net list (24) consisting of nodes, attributes and edges, whereby the software components (20-a, 20-b . . . 20-m)form the nodes, the initial parameters the attributes and the data channels the edges of the net list,
- the software components that are independent of the target system (20-a, 20-b . . . 20-m) are transformed into software components that are dependent on the target system,
- the software components that are dependent on the target system are instantiated at the target system and are parameterized by their command interface, and
- from the net list, the processing sequence of the software components is identified for processing in the correct information flow.

2. The process according to claim 1, wherein a filter and/or a sampling element is automatically proposed or inserted into the executable configuration (25), in the event there are frequency changes in the information flow.

3. The process according to claim 1, wherein the software components are processed at the target system, at least partially, in different threads.

4. The process according to claim 3, wherein different threads are at least partially synchronized with different frequencies.

5. The process according to claim 3, wherein generic processes run at the target system that make process space, mail boxes and threads available into which the software components are also loaded as dynamically loadable library and are instantiated as often as desired.

6. The process according to claim 3, wherein each software component is provided with a trigger, whereby the trigger information is automatically and transparently routed along the processing sequence.

7. The process according to claim 6, wherein a time budget is allocated to a trigger of a software component and a software component that exceeds this time budget is suspended or sends a warning.

8. The process according to claim 1, wherein a software component is processed at the target system in a cycle more than once.

9. The process according to claim 1, wherein the processing sequence is modified or switched during run-time between two complete cycles by preparing the, new processing sequence and the switching/modifying then takes place synchronously between the end of one and the beginning of the next cycle.

10. The process according to claim 1, wherein changes of an executable configuration (25) are performed by delta net lists, whereby a delta net list describes the net parts that are to be removed and the parts that are to be added and the exchange takes place at a point in time that is favorable as per the processing sequence.

11. The process according to claim 1, wherein software components are executed by different CPUs or different cores of a CPU at the target system.

12. A device for creating and executing a configuration executable on a target system for performing an automatization task on the target system, including a development unit (30) that is connected with the target system and wherein software components are executed by at least one CPU at the target system and in which
- a library (20) is provided from which a number of abstracted software components are selectable by a user interface (26), said software components are independent of the target system and implement individual functions of the target system and which are provided with a specified command interface (22) and a specified interface (21) to the data channels, and the selected software components that are independent of the target system can be interconnected via their data channels to form a model (23) for realizing the automatization task,
- a model transformation unit (27) is provided that automatically transforms the model (23) by a model transformation into a net list (24) consisting of nodes, attributes and edges, whereby the software components are the nodes, the initial parameters the attributes and the data channels the edges of the net list (24),
- a target system transformation unit (28) is provided that includes at least one CPU and which transforms the software components that are independent of the target system into software components that are dependent on the target system, that instantiates the software components that are dependent on the target system and parameterizes the net list (24) via their command interface and identifies the processing sequence of the software components for processing in correct information flow.

13. The device according to claim 12, wherein the target system is designed as multi-CPU or multi-core system and software components are executed on different CPUs or different cores of a CPU at the target system.

* * * * *